United States Patent
Scourtes

[11] Patent Number: 5,226,311
[45] Date of Patent: Jul. 13, 1993

[54] FLUID FLOW GENERATING APPARATUS
[75] Inventor: George Scourtes, Clearwater, Fla.
[73] Assignee: The Allen Group Inc., Livonia, Mich.
[21] Appl. No.: 686,165
[22] Filed: Apr. 16, 1991
[51] Int. Cl.$^5$ .............................................. G01M 19/00
[52] U.S. Cl. ..................... 73/119 A; 73/3; 92/222
[58] Field of Search ............ 73/119 A, 3; 92/13, 92/145, 1, 172, 222; 165/138, 141; 222/146.1, 146.2

[56] References Cited
U.S. PATENT DOCUMENTS

| | | | |
|---|---|---|---|
| 2,756,679 | 7/1956 | Meader | 103/48 |
| 3,267,719 | 8/1966 | Wagner et al. | 92/1 X |
| 3,404,606 | 10/1968 | Papst | 92/222 X |
| 3,407,644 | 10/1968 | Yusanami | 73/40 |
| 3,487,782 | 1/1970 | Henrotte | 103/6 |
| 3,495,426 | 2/1970 | Huot | 73/40 |
| 3,597,119 | 8/1971 | Gratzmuller | 417/360 |
| 4,041,778 | 8/1977 | Ikinobu | 73/119 A |
| 4,214,476 | 7/1980 | Koster et al. | 73/119 A |
| 4,286,930 | 9/1981 | Jarrett | 417/416 |
| 4,362,052 | 12/1982 | Heath et al. | 73/119 A |
| 4,625,544 | 12/1986 | Hi-Hwa Yuan et al. | 73/38 |
| 4,864,866 | 9/1989 | Hardy et al. | 73/837 X |

Primary Examiner—Jerry W. Myracle
Attorney, Agent, or Firm—Learman & McCulloch

[57] ABSTRACT

Apparatus for generating a precision fluid flow comprises a cylinder having side and end walls forming a fluid-receiving chamber having a fluid inlet and a fluid outlet. A cylindrical piston free of engagement with the cylinder side wall is movable longitudinally into the cylinder so as to displace through the fluid outlet a volume of fluid corresponding to the volume of the piston accommodated in the chamber. The piston is formed of a material which is substantially insensitive to variations in temperature and pressure of the fluid in the chamber so that the piston rod is substantially dimensionally stable. The piston is moved relative to the chamber by a precision driving mechanism either at a constant velocity to provide a constant volumetric flow of fluid through the outlet or at a variable velocity to provide a constant fluid pressure at the outlet.

24 Claims, 2 Drawing Sheets

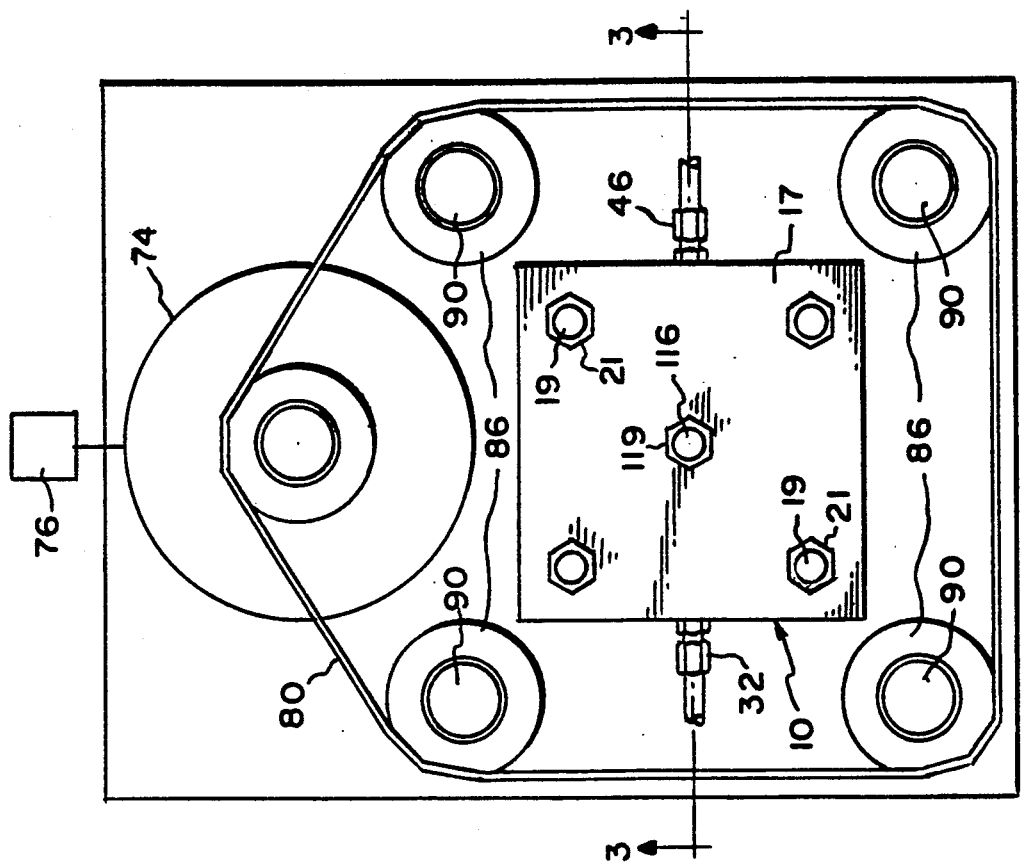
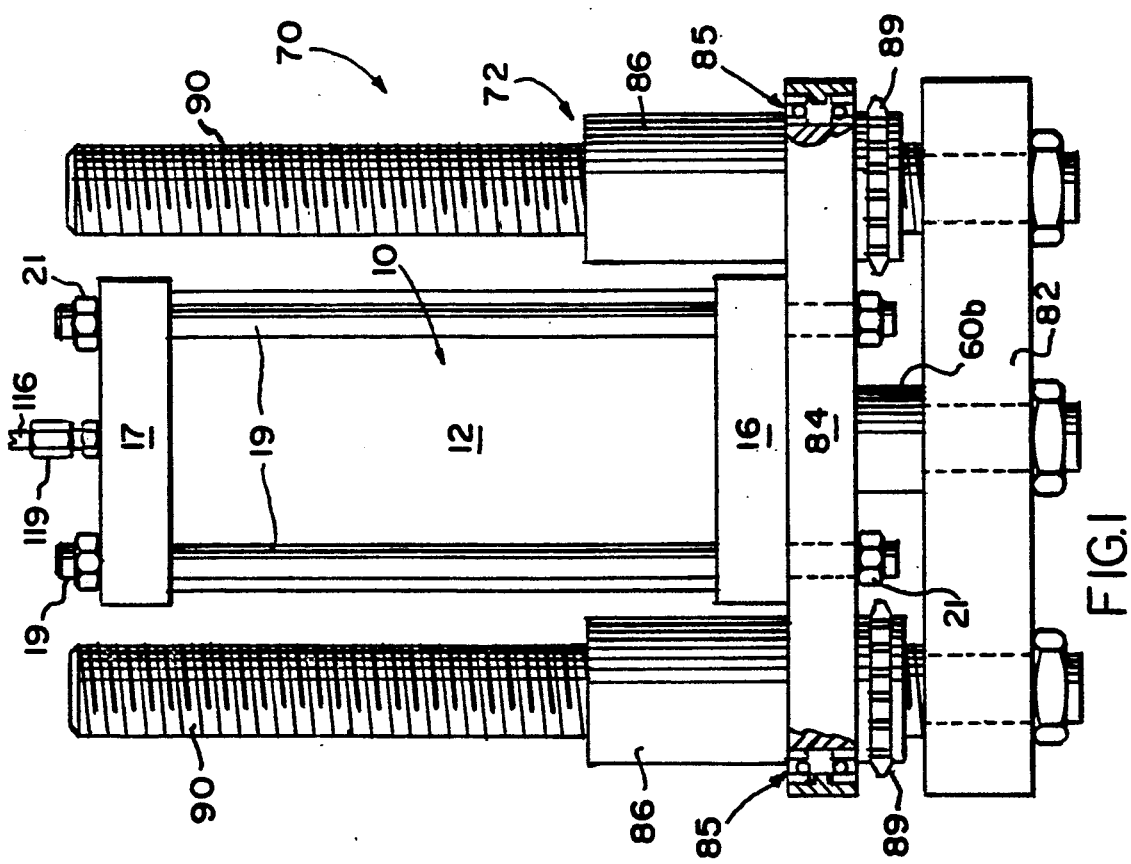

FLUID FLOW GENERATING APPARATUS

FIELD OF THE INVENTION

The present invention relates to apparatus for generating a controlled flow of fluid especially useful for, although not limited to, flow testing of fuel injector nozzles.

BACKGROUND OF THE INVENTION

Diesel engines of the type used in motor vehicles are subject to increasingly stringent emissions requirements. As a result, fuel injector nozzles used in diesel engines must be manufactured to rather strict fuel flow tolerances, for example, flow tolerances of ±0.3 pounds per hour (PPH) total error band. The nozzles must be tested individually prior to installation in an engine to determine whether the fuel flow performance falls within the required tolerances for emission control purposes. Typically, the fuel injector nozzles will be classified as "accepts" or "rejects" depending upon the flow test results; i.e. "accepts" will have satisfied the required flow tolerances whereas "rejects" will have fallen outside the required flow tolerances.

In order to flow test diesel engine fuel injector nozzles for emission control purposes, flow test systems of improved accuracy are needed to provide the extremely narrow flow error bands that will distinguish "accepts" from "rejects." To this end, the flow test systems require a flow generating apparatus that can provide a precise flow of fluid (actual or simulated fuel) as a primary flow standard for supply to each fuel injector nozzle tested. A flow generating apparatus of this type that does not require periodic active calibration and is capable of self-pumping to eliminate the need for a high pressure fluid pump would be highly desirable in an engine assembly facility for testing large numbers of fuel injector nozzles prior to installation in the engines.

An object of the present invention is to provide a precision fluid flow generating apparatus which satisfies these needs and thus is especially useful for, although not limited to, use in the flow testing of fuel injector nozzles.

SUMMARY OF THE INVENTION

The present invention relates to apparatus for generating a fluid flow wherein the apparatus comprises a fluid vessel having a cylinder wall closed at opposite ends by end walls so as to define a fluid chamber having a fluid inlet and a fluid outlet. A reciprocable piston extends through an end wall and is partially accommodated in the chamber. The piston has a cross-sectional area which is substantially less than that of the cylinder and does not engage the cylinder wall. However, movement of the piston into the chamber displaces fluid therefrom via the outlet.

The piston is formed of a material that is substantially insensitive to variations in the temperature and pressure of the fluid in the cylinder. Consequently, the piston is dimensionally stable and such dimensional stability contributes to the obtaining of a precision fluid flow rate at the fluid outlet regardless of the fluid temperature, pressure, viscosity, and specific gravity.

Means is provided for relatively moving the cylinder and the piston at a selected velocity for displacing fluid through the fluid outlet at a rate dependent on the relative velocity of the piston. A constant or variable fluid flow rate can be provided by providing a constant or variable piston velocity in the cylinder. In effect, the flow generating apparatus of the invention is self-pumping and dispenses with the need for a separate high pressure pump.

In one embodiment of the invention the piston comprises a solid, elongate rod having a substantially constant cross-section along that part of its length that can enter the cylinder. Preferably, the piston comprises a solid tungsten or other metal carbide cylindrical rod.

The piston is slideably accommodated in one end wall of the cylinder for movement toward the opposite end wall along the longitudinal axis of the cylinder. Preferably, the piston is movable vertically from a lower end wall toward an upper end wall that includes an upwardly converging fluid outlet port so as to facilitate escape of any air in the fluid.

The piston driving means may comprise a motor operably connected to the piston for moving the latter at a substantially constant velocity in the chamber to provide a substantially constant volumetric fluid flow rate through the fluid outlet. Alternatively, the piston driving means may comprise a motor operably connected to the piston rod for moving the latter at a variable velocity in the chamber to provide a variable fluid flow rate as needed to maintain a constant fluid pressure at the fluid outlet.

In a preferred embodiment of the invention a thermal chamber encircles the cylinder and communicates in recirculating manner with a fluid source and with the interior of the cylinder via the fluid inlet for supplying the cylinder with fluid and maintaining the fluid at a controlled temperature.

In the preferred embodiment of the invention fixture means is provided for holding a fuel injector nozzle to be tested in communication with the fluid outlet for receiving the fluid flow pumped by the piston through the fluid outlet.

THE DRAWINGS

FIG. 1 is a fragmentary elevational view, partly in section, of a flow generating apparatus constructed in accordance with one embodiment of the invention;

FIG. 2 is a top plan view of the flow generating apparatus of FIG. 1; and

DETAILED DESCRIPTION

Figure 3:
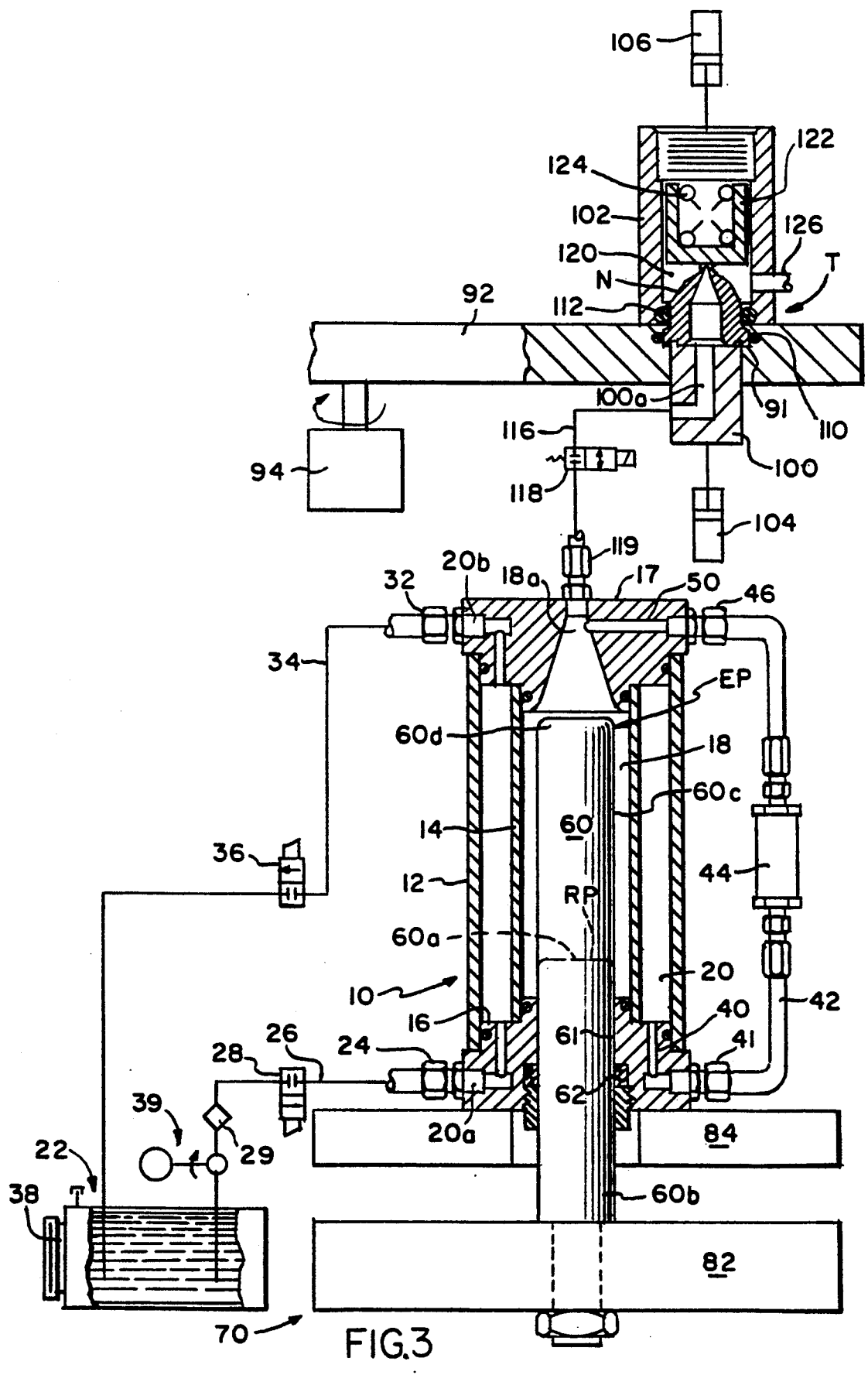
FIG. 3 is a sectional view taken along the line 3—3 of FIG. 2 and showing diagrammatically the fluid circulation system and a typical nozzle under test.

FIGS. 1-3 illustrate one embodiment of apparatus for generating a precise volumetric fluid flow rate for use in flow testing a fuel injector nozzle N (shown in FIG. 3) such as a diesel engine fuel injector nozzle cup. In particular, the flow generating apparatus comprises a fluid pressure vessel 10 having an outer cylinder wall 12 and a concentric inner cylinder wall 14, both of which are closed at opposite axial ends by lower and upper end walls 16 and 17, respectively. The walls 12, 14, 16, and 17 are held together by a plurality of tie rods 19 and nuts 21 (not shown in FIG. 3 in the interest of clarity).

Referring to FIG. 3, the inner cylinder wall 14 and the opposite end walls 16 and 17 define a cylindrical fluid chamber 18. The outer cylinder wall 12 encircles or jackets the inner cylinder wall 14 to form with the latter an annular chamber 20. The chamber 20 communicates in recirculating manner with a fluid reservoir or source 22 of diesel fuel or simulated diesel fuel (e.g., water). The inlet port 20a of the chamber 20 is located in the lower end wall 16 and communicates with the reservoir 22 via a fitting 24, a conduit 26, a valve 28, and a filter 29. The outlet port 20b of the chamber 20 is located in the upper end wall 17 and communicates with the reservoir 22 via a fitting 32, a conduit 34, and a valve 36.

The reservoir 22 includes a heat exchanger 38 of known kind for maintaining the fluid in the chamber 18 within ±1.0° F. of a selected fluid operating temperature, such as 104° F. The reservoir 22 also includes a low wattage electric heater (not shown) to bring the fluid to the desired operating temperature upon start-up of the test system.

The temperature controlled fluid is circulated between the reservoir 22 and the annular chamber 20 by a motor-driven pump 40. The fluid circulating through the chamber 20 encircles the chamber 18 and functions to maintain the fluid therein at a substantially constant temperature (±1.0° F. within 104° F.) for delivery to the fuel injector nozzle N to be tested. Suitable temperature sensors (not shown) are provided to measure the fluid temperature at the fuel injector nozzle N and at the reservoir heat exchanger for input to a computer or other suitable control unit for fluid temperature control purposes.

Fluid from the chamber 20 also can flow into the chamber 18 via an outlet passage 40 in the lower end wall 16, a fitting 41, a conduit 42, a check valve 44, and a fitting 46 in communication with an inlet passage 50 in the upper end wall 17 as shown. The inlet passage 50 communicates with the chamber 18 via an upwardly converging outlet port 18a formed in the upper end wall 17.

An elongate, solid, cylindrical piston 60 slideably extends through an opening 61 in the lower end wall 16 for movement inwardly and outwardly of the chamber 18 along the longitudinal axis thereof. The piston 60 is sealingly received in the lower end wall 16 by a packing 62. The upper portion 60a of the piston 60 is received in the chamber 18 and the lower portion 60b is located exteriorly thereof. As is apparent from FIG. 3, the piston 60 has a cross-sectional area that is considerably smaller than the cross-sectional area of the chamber 18. Accordingly, the outer piston surface 60c is at all times spaced from and out of engagement with the cylinder wall 14. No seals are used or needed between the piston surface 60c and the cylinder wall 14.

Movement of the piston 60 inwardly of the chamber 18 will displace fluid therefrom through the fluid outlet port 18a. The volume of fluid displaced will correspond to the volume of the piston that moves into the chamber 18. In effect, the piston 60 functions to pump (displace) fluid from the chamber 18 through the fluid outlet port 18a to the fuel injector nozzle N being tested. Preferably, the piston 60 has a constant cross-sectional area along its length to facilitate determination of the fluid volume that will be displaced over time in response to movement of the piston inwardly of the chamber 18. Use of the piston 60 to displace the fluid through the outlet port 18a imparts to the apparatus a self-pumping action that eliminates the need for a separate high pressure fluid pump in the test system.

The piston 60 is formed of a material that is substantially insensitive to the ranges of variations in temperature and pressure of the fluid in the chamber 18 during testing. Consequently, the piston itself is dimensionally stable as it moves into the chamber 18. This dimensional stability of the piston 60 contributes to the obtaining of a precise fluid flow rate through the outlet port 18a, regardless of variations in the fluid temperature, pressure, viscosity, and specific gravity during testing. The surface 60c of the piston rod 60 is machined to a highly smooth or polished finish for improved dimensional control purposes.

The piston 60 preferably is formed of a metal carbide, such as tungsten carbide. A solid tungsten carbide piston 60 exhibits virtually no expansion or contraction over the temperature and pressure ranges of operation of the apparatus. However, the invention is not limited to the use of tungsten carbide pistons. Any other material having the desired dimensional stability may be used.

The lower end 60b of the piston 60 is connected to suitable precision piston driving means 70 to drive the piston 60 relative to the cylinder 14 at a precise rate (velocity). The vertical orientation of the cylinder and the piston, together with the upwardly converging outlet port 18a, facilitates escape of any air in the fluid.

The piston driving means 70 comprises a precision ball screw mechanism 72 operably coupled to the piston end 60b and a digital servo motor 74 to drive the ball screw mechanism at a precise rate. A known, absolute position encoder 76 (shown schematically) may be used to measure the rate of travel (velocity) of the piston 60 as it is driven by the motor 74 via the ball screw mechanism 72. The motor 74 is a conventional, precision digital servo unit drivingly connected to the ball screw mechanism 72 by an endless chain 80 in engagement with a sprocket 89 on each rotatable ball nut 86, as is best shown in FIG. 2.

The ball screw mechanism 72 includes a movable plate 82 to which the piston end 60b is fastened and a fixed plate 84 that rotatably supports the ball nut 86 via bearings 85 so that the ball nuts 86 can be rotated by the motor 74. Rotation of the ball nuts 86 effects linear movement of the ball screws 90 as well as the plate 82 and the piston 60. The piston 60 is moved upwardly or downwardly depending upon the direction of rotation of the ball nuts 86.

In one mode of operation the motor 74 may be operated at a constant speed to move the piston 60 at a substantially constant velocity into the chamber 18 and thereby provide a substantially constant volumetric fluid flow rate at the fluid outlet port 18a.

In such mode of operation the free, upper end 60a of the piston 60 initially is located in the chamber 18 at a retracted position RP (shown in phantom in FIG. 3) proximate the lower end wall 16 and then is moved vertically upward at a substantially constant velocity by the driving means 70 to an extended position EP (shown in solid lines in FIG. 3) proximate the opposite upper end wall 17.

A plurality of fuel injector nozzles N (only one of which is shown in FIG. 3) are disposed in circumferentially spaced nests 91 of an indexable rotary table 92 that is rotated by a suitable driving motor 94. The table 92 is indexed in successive increments to position each nozzle N to be tested at a test position T between opposing lower and upper clamping fixtures 100 and 102, respectively. The fixtures 100 and 102 are moved by respective fluid actuators 104 and 106 (shown schematically) toward one another to clamp and the nozzle N therebetween. The fixtures include respective seals 110 and 112 for this purpose. When the nozzle N is clamped, it communicates with the fluid outlet port 18a of the chamber 18 by a passage 100a in the fixture 100, a conduit 116, a valve 118, and a fitting 119. For flow testing, the valve 118 is opened to deliver fluid displaced from the chamber 18 to the nozzle N.

The fixture 102 has a chamber 120 within which the nozzle N may be accommodated. Slideably received in the chamber 120 is a piston 122 which yieldably is biased toward the nozzle by a spring 124. The chamber has a fluid exhaust line 126.

In operation to flow test a clamped nozzle N, the piston 60 is located initially in the retracted position RP. The pump 40 is operated and the valves 28 and 36 are adjusted to enable fluid to flow from the reservoir 22 into the thermal chamber 20 and from such chamber into the chamber 18 to fill the latter with fluid. The valve 118 is opened at this time to purge the chamber 18, the conduit 116, and the passage 100a in communication with the nozzle N. After purging, the valve 118 is closed to isolate fluid in the chamber 18 from the remainder of the fluid system. Fluid continues to circulate from the reservoir 22 through the thermal chamber 20 and back to the reservoir to establish the temperature of the fluid in the chamber 18 within selected limits as described above.

When the temperature of the fluid in the chamber 18 stabilizes at a selected value, the valve 118 is reopened and the piston 60 is driven vertically upward in the chamber 18 from the retracted position RP toward the extended position EP at a selected constant velocity, thereby displacing to the nozzle N a volume of fluid corresponding to the volume of the piston 60 that has moved into the chamber 18. The check valve 44 prevents fluid flow back to the thermal chamber 20 as the piston 60 is moved. Fluid discharged through the nozzle is drained from the chamber 120 by the line 126.

Following a test, the fixtures 100, 102 are separated thereby enabling the piston 122 to eject the tested nozzle N from the chamber 120.

The volume of fluid that is displaced from the chamber 18 corresponds to the additional volume of the piston that moves into the chamber 18; i.e., the volume of the piston in the chamber 18 at the extended position EP less the volume of the piston at the retracted position RP. Since the rate (velocity) at which the piston 60 moves is precisely controlled by the motor 74 and known from the precision position encoder 76, and since the net volume of the dimensionally stable piston 60 in the chamber 18 is known with precision, the volumetric fluid flow rate to the nozzle N easily and precisely may be determined. The volumetric fluid flow rate to the nozzle N can be converted to mass flow rate using the measured specific gravity of the fluid supplied to the chamber 18.

A weigh/time tare system (not shown), including a fluid collection container on a precision electronic weight scale, collects the fluid discharged from the nozzle N over a given time to measure the mass flow rate (e.g., pounds per hour) through the nozzle N. The measured mass flow rate determines whether or not the particular nozzle meets the established mass flow standards required for diesel engine fuel injector nozzles for reduced emission control purposes.

In the disclosed embodiment, the flow generating apparatus of the invention provides a precision fluid flow standard for high accuracy flow testing of the nozzles N. Moreover, the apparatus requires only periodic passive calibration wherein the accuracy of the volumetric displacement of fluid from the chamber 18 is checked by collecting a volume of displaced fluid in a standardized container and wherein the accuracy of the servo motor speed is checked by monitoring the frequency output of the position encoder while the servo motor is running at constant speed.

Although the apparatus of the invention has been described above as operating to provide a constant volumetric fluid flow rate to the nozzle N being tested, the invention is not so limited and can be practiced to provide a variable flow rate at the outlet port 18a as needed to provide a constant pressure drop across the nozzle N. In this mode of operation, the motor 74 is controlled to drive the piston 60 at a variable velocity in the chamber 18 as needed to provide a desired constant fluid pressure at the outlet port 18a and thus across the fuel injector nozzle N. One or more pressure sensors (not shown) may be located at the fixture 100 to sense pressure at the nozzle N and provide feedback for controlling the speed of the motor 74 and thus the velocity of the piston 60 so as to maintain a substantially constant pressure across the nozzle N.

Operation of the apparatus to provide a constant pressure at the outlet port 18a also is useful in leak testing of a manufactured part. For example, leak testing of an internal combustion engine crankcase can be conducted using the apparatus to maintain a constant fluid pressure therein while the leak rate is monitored by sensing the speed of the servo motor 74 on a continuous basis. Instantaneous leak flow rates can thereby be determined in this manner.

This disclosure is representative of presently preferred embodiments of the invention, but is intended to be illustrative rather than definitive thereof. The invention is defined in the claims.

I claim:
1. Apparatus for generating a fluid flow comprising:
   a. a cylinder having a side wall and two end walls forming a fluid chamber having a fluid outlet;
   b. a piston extending through an opening in one wall of said cylinder and being partially accommodated in the chamber for movement relative thereto in a direction to increase the volume of said piston in said cylinder and displace through the fluid outlet a volume of fluid corresponding to the change of volume of the piston within the chamber, said piston being free of engagement with said side wall and being formed of material substantially insensitive to variations in temperature and pressure of the fluid in said chamber so that said piston is substantially dimensionally stable;
   c. a seal between said piston and said one wall and sealing said opening; and
   d. means for moving said piston in said direction relative to said cylinder.
2. The apparatus of claim 1 wherein the piston comprises a solid, elongate rod having a substantially constant cross-section along its length.
3. The apparatus of claim 1 wherein the material from which said piston is formed is a metal carbide.
4. The apparatus of claim 3 wherein the metal carbide is tungsten carbide.
5. The apparatus of claim 1 wherein said means for relatively moving the cylinder and the piston comprises a motor operably connected to the piston for driving the latter.
6. The apparatus of claim 5 wherein said motor drives said piston at a constant velocity.

7. The apparatus of claim 5 wherein said motor drives said piston at a variable velocity.

8. The apparatus of claim 5 further comprising means operably associated with the motor for measuring the velocity of the piston.

9. The apparatus of claim 1 wherein the piston is slideably accommodated in one end wall of the cylinder for movement toward the other end wall along a longitudinal axis of the chamber.

10. The apparatus of claim 9 wherein the longitudinal axis of the chamber is vertically oriented.

11. The apparatus of claim 10 wherein the fluid outlet is in said other end wall and includes an upwardly converging port.

12. The apparatus of claim 1 including inlet means for supplying fluid to the chamber.

13. Apparatus for generating a fluid flow for use in testing a fuel injector nozzle comprising:
   a. a cylinder having a side wall and two end walls forming a fluid chamber having an inlet and an outlet;
   b. a piston extending into said chamber through one of said end walls and being movable toward the other of said end walls to displace through the outlet a volume of fluid corresponding to the volume of the piston that moves into the chamber, said piston being free of engagement with said side wall and being formed of a material substantially insensitive to variations in temperature and pressure of the fluid in said chamber so that said piston is substantially dimensionally stable;
   c. means for moving the piston inward of the chamber to displace the fluid through the outlet at a rate dependent on the velocity of the movement of the piston; and
   d. fixture means for holding a fuel injector nozzle to be tested in communication with the outlet for receiving the fluid displaced by the piston through the outlet.

14. The apparatus of claim 13 wherein the piston comprises a solid, elongate rod having a substantially constant cross-section.

15. The apparatus of claim 14 wherein the material from which said piston is formed is a metal carbide.

16. The apparatus of claim 13 wherein the material from which said piston is formed is tungsten carbide.

17. The apparatus of claim 13 wherein said means for moving the piston comprises a motor operably connected to the piston for moving the latter at a constant velocity.

18. The apparatus of claim 17 further comprising means for measuring the velocity of the piston.

19. The apparatus of claim 13 wherein said means for moving the piston comprises a motor operably connected to the piston for moving the latter at such velocity as to provide a constant pressure drop across the nozzle.

20. The apparatus of claim 19 wherein said cylinder is upright and said piston is moved vertically.

21. The apparatus of claim 20 wherein the outlet is in the uppermost end wall and has an upwardly converging port.

22. Apparatus for generating a fluid flow comprising:
   a. a cylinder having a side wall and two end walls forming a fluid chamber having fluid inlet means and fluid outlet means, said fluid inlet means comprising an annular chamber encircling said fluid chamber and communicating with a fluid source and said fluid chamber;
   b. a piston partially accommodated in the chamber for movement relative thereto for displacing through the fluid outlet a volume of fluid corresponding to the volume of the piston within the chamber, said piston being free of engagement with said side wall and being formed of material substantially insensitive to variations in temperature and pressure of the fluid in said chamber so that said piston is substantially dimensionally stable; and
   c. means for moving said piston relative to said cylinder for displacing fluid through the fluid outlet.

23. Apparatus for generating a precise volume of fluid flow comprising:
   a. a cylinder having a side wall and two end walls forming a fluid chamber having a fluid outlet;
   b. a piston extending through an opening in one of said walls and being partially accommodated in the chamber for movement relative thereto in a direction to increase the volume of said piston in said chamber and displace through the fluid outlet a volume of fluid corresponding to the change of volume of the piston within the chamber, said piston being free of engagement with said side wall and being formed of material substantially insensitive to variations in temperature and pressure of the fluid in said chamber so that said piston is substantially dimensionally stable;
   c. a seal between said piston and said one of said walls and sealing said opening; and
   d. means for moving said piston in said direction into said cylinder a distance sufficient to displace said precise volume of fluid through the fluid outlet.

24. Apparatus for generating a precise rate of fluid flow comprising:
   a. a cylinder having a side wall and two end walls forming a fluid chamber having an inlet and an outlet;
   b. a piston partially accommodated in said chamber and extending through an opening in one of said end walls for movement in a direction inward of said cylinder and toward the other of said end walls to displace through the outlet a volume of fluid corresponding to the additional volume of the piston that is accommodated in the chamber in response to movement of said piston in said direction, said piston being free of engagement with said side wall and being formed of a material substantially insensitive to variations in temperature and pressure of the fluid in said chamber so that said piston is substantially dimensionally stable;
   c. a seal between said piston and said one of said end walls and sealing said opening; and
   d. means for moving the piston in said direction and inward of said chamber at a rate of speed sufficient to displace the fluid through the outlet at said precise rate of flow.

\* \* \* \* \*